US012286812B2

(12) United States Patent
Lee

(10) Patent No.: US 12,286,812 B2
(45) Date of Patent: Apr. 29, 2025

(54) PUSH-PULL DOOR LOCK HAVING LOCKING MEANS

(71) Applicant: ANYLOCK CO., LTD., Incheon (KR)

(72) Inventor: Hyun Jin Lee, Siheung-si (KR)

(73) Assignee: ANYLOK CO., LTD. (KR)

( * ) Notice: Subject to any disclaimer, the term of this patent is extended or adjusted under 35 U.S.C. 154(b) by 134 days.

(21) Appl. No.: 18/024,965

(22) PCT Filed: May 18, 2021

(86) PCT No.: PCT/KR2021/006243
§ 371 (c)(1),
(2) Date: Mar. 6, 2023

(87) PCT Pub. No.: WO2022/055072
PCT Pub. Date: Mar. 17, 2022

(65) Prior Publication Data

US 2023/0332432 A1 Oct. 19, 2023

(30) Foreign Application Priority Data

Sep. 9, 2020 (KR) ........................ 10-2020-0115127

(51) Int. Cl.
*E05B 13/10* (2006.01)
*E05B 7/00* (2006.01)

(52) U.S. Cl.
CPC ................ *E05B 13/10* (2013.01); *E05B 7/00* (2013.01)

(58) Field of Classification Search
CPC ........ E05B 13/00; E05B 13/10; E05B 13/101; E05B 13/103; E05B 13/105; E05B 13/106; E05B 13/108; E05B 7/00; E05B 5/00; E05B 85/00; E05B 85/14
USPC ........................................................... 70/101
See application file for complete search history.

(56) References Cited

U.S. PATENT DOCUMENTS 6,139,072 A * 10/2000 Lee ........................... E05C 1/14 292/168
2017/0130482 A1* 5/2017 Ek ........................... E05B 1/003

FOREIGN PATENT DOCUMENTS

| | | | |
|---|---|---|---|
| CN | 208669112 U | | 3/2019 |
| KR | 20170029895 A | * | 3/2017 |
| KR | 101742771 B1 | | 6/2017 |
| KR | 101868469 B1 | * | 6/2018 |

(Continued)

OTHER PUBLICATIONS

International Search Report for PCT/KR2021/006243, mailed Sep. 1, 2021.

*Primary Examiner* — Nathan Cumar
(74) *Attorney, Agent, or Firm* — Renaissance IP Law Group LLP

(57) ABSTRACT

The present invention relates to a push pull door lock that includes a door locking part disposed inside a door to lock the door, bodies fixedly located to the indoor and outdoor sides of the door, handles pushedly or pulledly disposed on the bodies to release a locking state of the door locking part, and locking means disposed on the bodies to lock the operations of the handles so that the door is locked, wherein the locking means includes: a key knob rotatably disposed on the body located on the indoor side of the door; a key assembly rotatably disposed on the body located on the outdoor side of the door and connectedly rotating unitarily with the key knob; and a stopper connectedly rotating unitarily with the key assembly and locking the operations of the handles.

5 Claims, 8 Drawing Sheets

(56) References Cited

FOREIGN PATENT DOCUMENTS

| | | | |
|---|---|---|---|
| KR | 102129812 | B1 * | 7/2020 |
| KR | 20200123755 | A | 10/2020 |

* cited by examiner

PUSH-PULL DOOR LOCK HAVING LOCKING MEANS

TECHNICAL FIELD

The present invention relates to a push pull door lock, and more specifically, to a push pull door lock having locking means configured integrally therewith to lock an operation thereof, so that a door is locked.

BACKGROUND ART

Generally, door locks are locking means mounted on a door to open and close the door, and for example, digital door locks with mortises and keypads and handle type door locks with latch units (locking parts) and handle units have been widely used as the door locks.

In addition, recently, push pull door locks, which are adapted to lock and unlock a door by pushing or pulling push pull handles disposed on indoor and outdoor sides of the door, have been widely used.

The push pull door locks have been suggested and developed in various forms, but generally, the push pull door lock includes handles disposed on indoor and outdoor sides of a door and a door locking part built in the door to lock or unlock the door, so that as the handles are pushed or pulled according to the opening and closing directions of the door, the locking state of the door locking part is released to open the door.

One of such conventional push pull door locks is disclosed in Korean Patent No. 10-2141548 entitled "Push pull door lock operating in push/pull direction".

The conventional push pull door lock is configured to pull or push handle bodies from and toward support parts in forward and backward (upward and downward) directions, rotate the handle bodies, and open a door, and in specific, the door lock includes the support parts disposed on indoor and outdoor sides of the door and the handle bodies disposed on the support parts and pulled or pushed from and toward the support parts, so that the locking state of the door locking part is released to open the door.

Like this, the operating directions of the handle bodies are different according to the opening directions of the door, and accordingly, the structures of the door locking part operating by the respective handle bodies are made differently on the indoor and outdoor sides of the door.

That is, if the door rotates toward the outside of a house and is thus open, the door locking part is open when the outdoor handle body is pulled from the support part and thus rotates, whereas the locking part is open when the indoor handle body is pushed toward the support part and thus rotates, so that the opening direction of the door corresponds to the rotating direction of the handle body, thereby making it convenient to use the push pull door lock.

However, the conventional push pull door lock is configured to have a plurality of components disposed in a narrow internal space of each handle body, thereby being complicated in the internal structure thereof and making the structure connected to the door locking part also complicated. Accordingly, the conventional push pull door lock fails to build locking means for locking the operation thereof.

If it is desired to provide the locking means, however, the support parts to which the handle bodies are hinge-coupled have to extend, and the locking means are located on the extending support parts. Further, interlocking means adapted to allow the locking means and the door locking part to connectedly interlock with each other has to be additionally provided. As a result, the push pull door lock becomes bulky in volume, complicated in configuration, and larger in size.

PRIOR ART LITERATURE

Patent Document

Korean Patent No. 10-2141548

DISCLOSURE OF THE INVENTION

Technical Problem

Accordingly, the present invention has been made in view of the above-mentioned problems occurring in the related art, and it is an object of the present invention to provide a push pull door lock that is capable of being configured integrally with locking means having a key knob and a key assembly interlocking with each other therein, thereby locking the operation thereof to thus lock a door.

Technical Solution

To accomplish the above-mentioned objects, according to the present invention, a push pull door lock may include a door locking part disposed inside a door to lock the door, bodies fixedly located to the indoor and outdoor sides of the door, handles pushedly or pulledly disposed on the bodies to release a locking state of the door locking part, and locking means disposed on the bodies to lock the operations of the handles so that the door is locked, wherein the locking means comprises: a key knob rotatably disposed on the body located on the indoor side of the door; a key assembly rotatably disposed on the body located on the outdoor side of the door and connectedly rotating unitarily with the key knob; and a stopper connectedly rotating unitarily with the key assembly and locking the operations of the handles.

Further, each body may include a guide plate moving upward and downward therein by means of the pushing or pulling operation of the handle, and the locking means may include a cover fixedly coupled to the front surface of the guide plate, while allowing one surface facing the guide plate to be spaced apart from the guide plate, the cover having locking grooves formed on the upper and lower ends thereof to come into contact with the stopper rotating, so that as the stopper rotates between the guide plate and the cover, the stopper may be locked onto the locking grooves of the cover to stop the upward and downward movements of the guide plate.

Furthermore, the stopper may have the shape of a rectangle with curved portions protruding from both ends thereof in a longitudinal direction thereof, the curved portions each having the same circumferential surface as the arch formed upon the rotation of the stopper, and the inner peripheral surfaces of the locking grooves of the cover may be curved to the shapes of arches corresponding to the curved portions, so that the curved portions of the stopper may be surface-contacted with the locking grooves of the cover.

Moreover, the key assembly may include a locking shaft connectedly rotating unitarily with the key knob by the rotation of a key coupled thereto, and the stopper is rotatably coupled to the key knob, coupledly passes the locking shaft therethrough, and rotates unitarily with the locking shaft.

Further, each body may include a rotary link rotating in the same direction as the rotating direction of the handle by means of the pushing or pulling operation of the handle to move the guide plate upward and downward and a spindle rotating in the perpendicular direction to the rotating direction of the handle by means of the upward and downward movements of the guide plate to operate the door locking part, so that the locking state of the door locking part is released.

Furthermore, the spindle may have a plurality of protrusions protruding outward therefrom and spaced apart from each other, and one side of the guide plate may be coupled between both protrusions, so that the upward and downward movements of the guide plate may be converted into the rotating operations of the spindle.

Advantageous Effects

According to the present invention, the push pull door lock is provided with the locking means having the key knob, the key assembly, and the stopper disposed in the indoor and outdoor bodies and interlocking with one another, thereby locking the operations of the handles to thus lock the operation thereof.

BEST MODE FOR INVENTION

Figure 1:
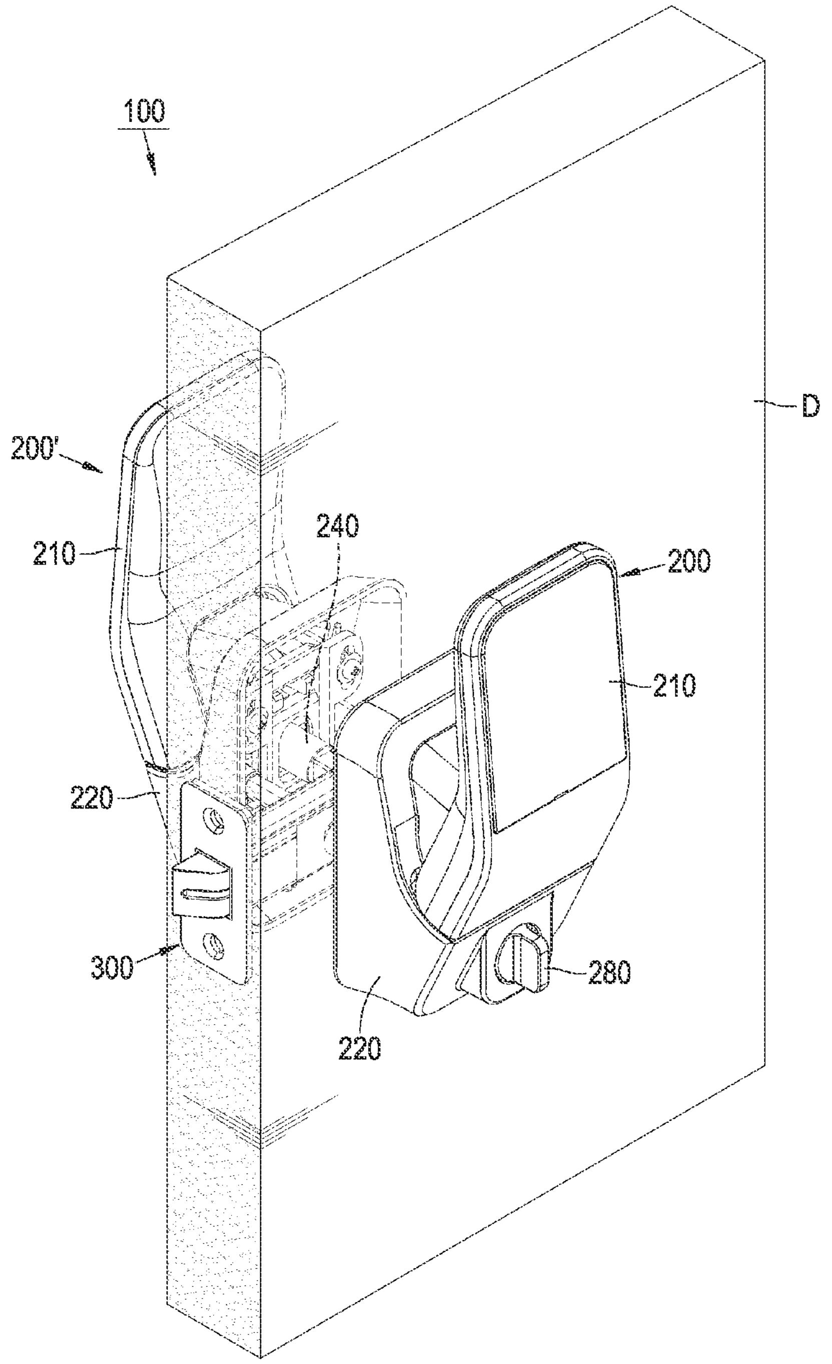
FIG. 1 is a perspective view showing a push pull door lock according to the present invention after installed.

Hereinafter, example embodiments will be described with reference to the accompanying drawings.

It should be noted that the use of particular terminology when describing certain features or aspect of the disclosure should not be taken to imply that the terminology is being re-defined herein to be restricted to include any specific characteristics of the features or aspects of the disclosure with which that terminology is associated.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Terms used in the description may be used to describe various elements, but the elements should not be restricted by the terms. The terms are used to only distinguish one element from the other element.

If it is determined that the detailed explanation on the well known technology related to the present invention makes the scope of the present invention not clear, the explanation will be avoided for the brevity of the description.

FIGS. 1 to 8 show a configuration and operating states of a push pull door lock according to the present invention.

As shown in FIG. 1, a push pull door lock 100 according to the present invention includes a door locking part 300 disposed inside a door D to lock the door D, handle parts 200 and 200' disposed on the indoor and outdoor sides of the door D, and locking means disposed on the handle parts 200 and 200' to lock the operations of the handle parts 200 and 200' and thus lock the door D.

In specific, the push pull door lock 100 is configured to allow the handle parts 200 and 200' disposed on the indoor and outdoor sides of the door D to be pushed or pulled according to opening and closing directions of the door D, thereby releasing the locking state of the door locking part 300 to thus open the door D.

Figure 2:
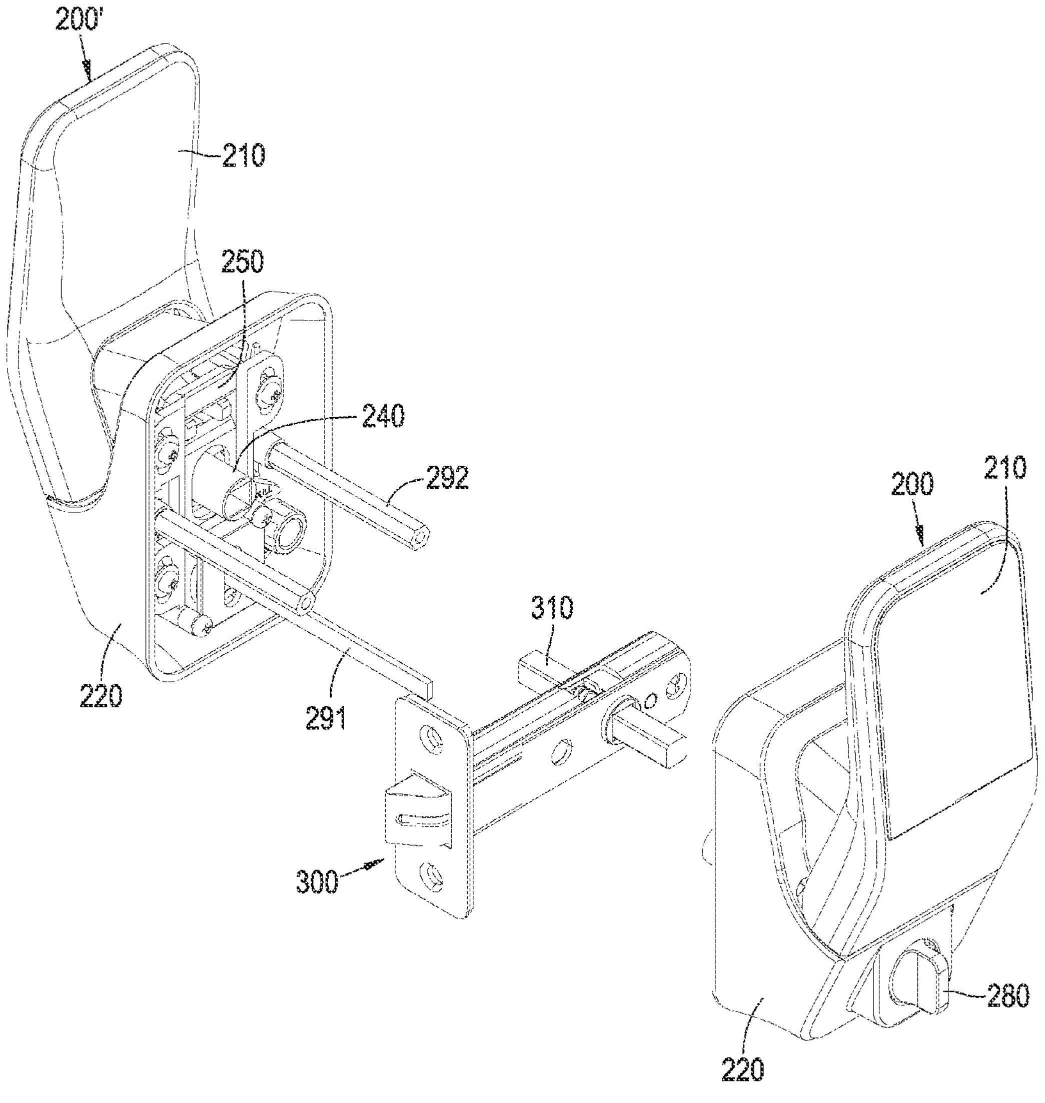
FIG. 2 is an exploded perspective view showing the push pull door lock according to the present invention.

As shown in FIG. 2, the handle parts 200 and 200' have an indoor handle 210 disposed on the indoor side of the door D and an outdoor handle 210 disposed on the outdoor side of the door D with respect to the door locking part 300.

The indoor handle and the outdoor handle have spindles 240 disposed on the surfaces facing each other and non-rotatably coupled to both ends of a rotary shaft 310 protruding from both sides of the door locking part 300, and accordingly, the indoor handle and the outdoor handle interlock with each other by means of the rotary shaft 310 of the door locking part 300.

Further, the indoor handle and the outdoor handle have the same internal structure as each other, but there are differences in that the outdoor handle is provided with a key assembly 290 and the indoor handle is provided with a key knob 280 connected to the key assembly 290 and operating together with the key assembly 290.

Hereinafter, in explaining the outdoor handle and the indoor handle, the outdoor handle and the indoor handle will be represented as the handles 210 with the same reference numeral as each other, but in explaining the differences between the two handles 210, the handles 210 will be represented as the outdoor handle and the indoor handle.

Figure 3:
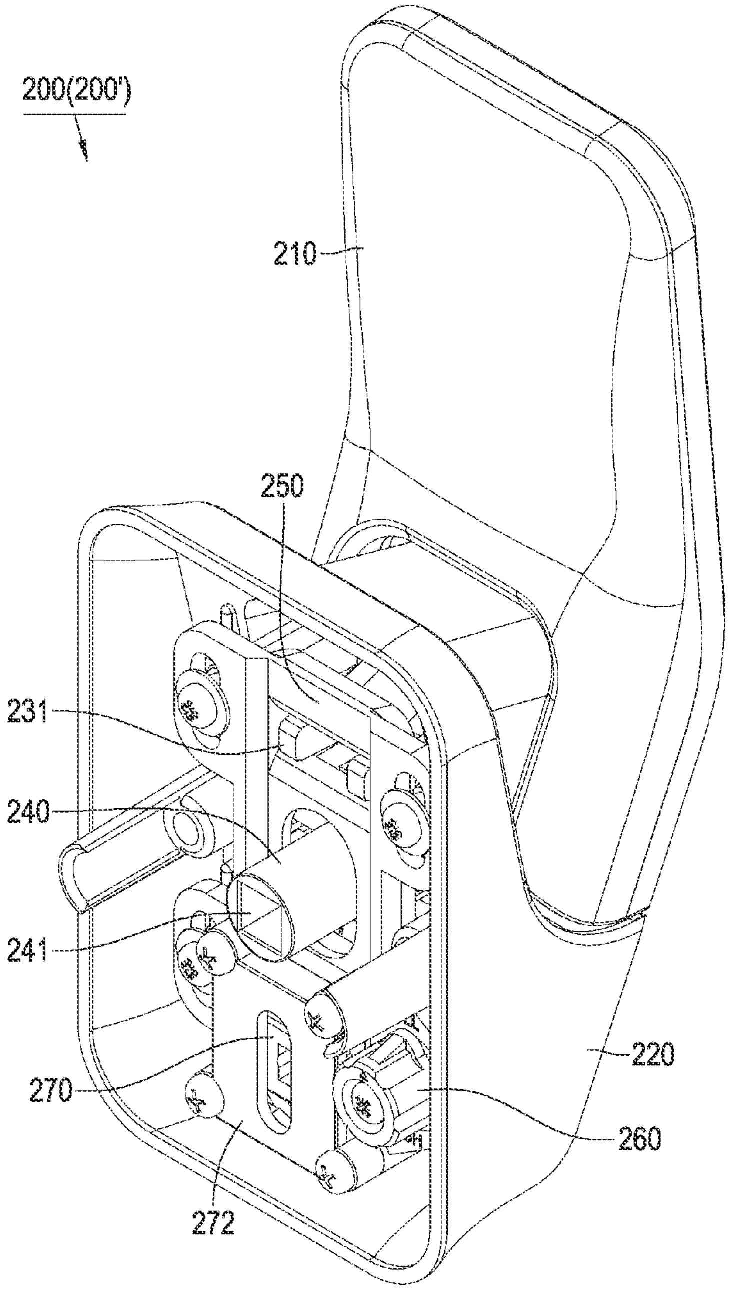
FIG. 3 is a perspective view showing the internal structure of an indoor handle of handle parts of the push pull door lock according to the present invention.

Further, as shown in FIG. 3, the handle parts 200 and 200' each have a body 220 fixedly coupled to the door D and the handle 210 rotatably disposed on the outer surface of the body 220 and pushed or pulled to release the locking state of the door locking part 300.

The lower end portion of the handle 210 is hinge-coupled to the body 220, and accordingly, the upper end portion of the handle 210 is pushed toward the body 220 or pulled from the body 220 around the hinge on the lower end portion of the handle 210, so that the handle 210 rotates.

Figure 4:
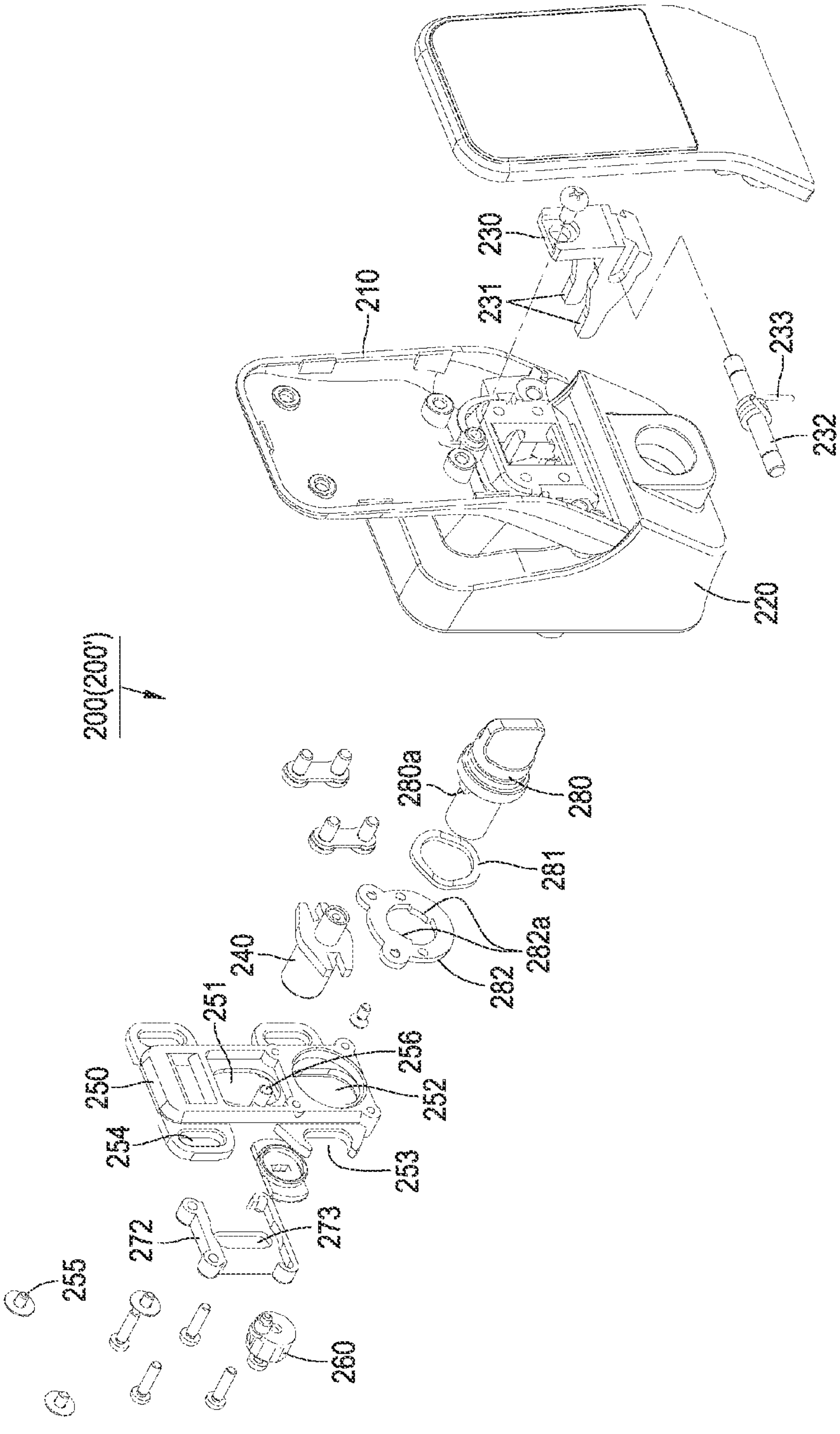
FIG. 4 is an exploded perspective view showing the indoor handle of FIG. 3 in one direction.
Figure 5:
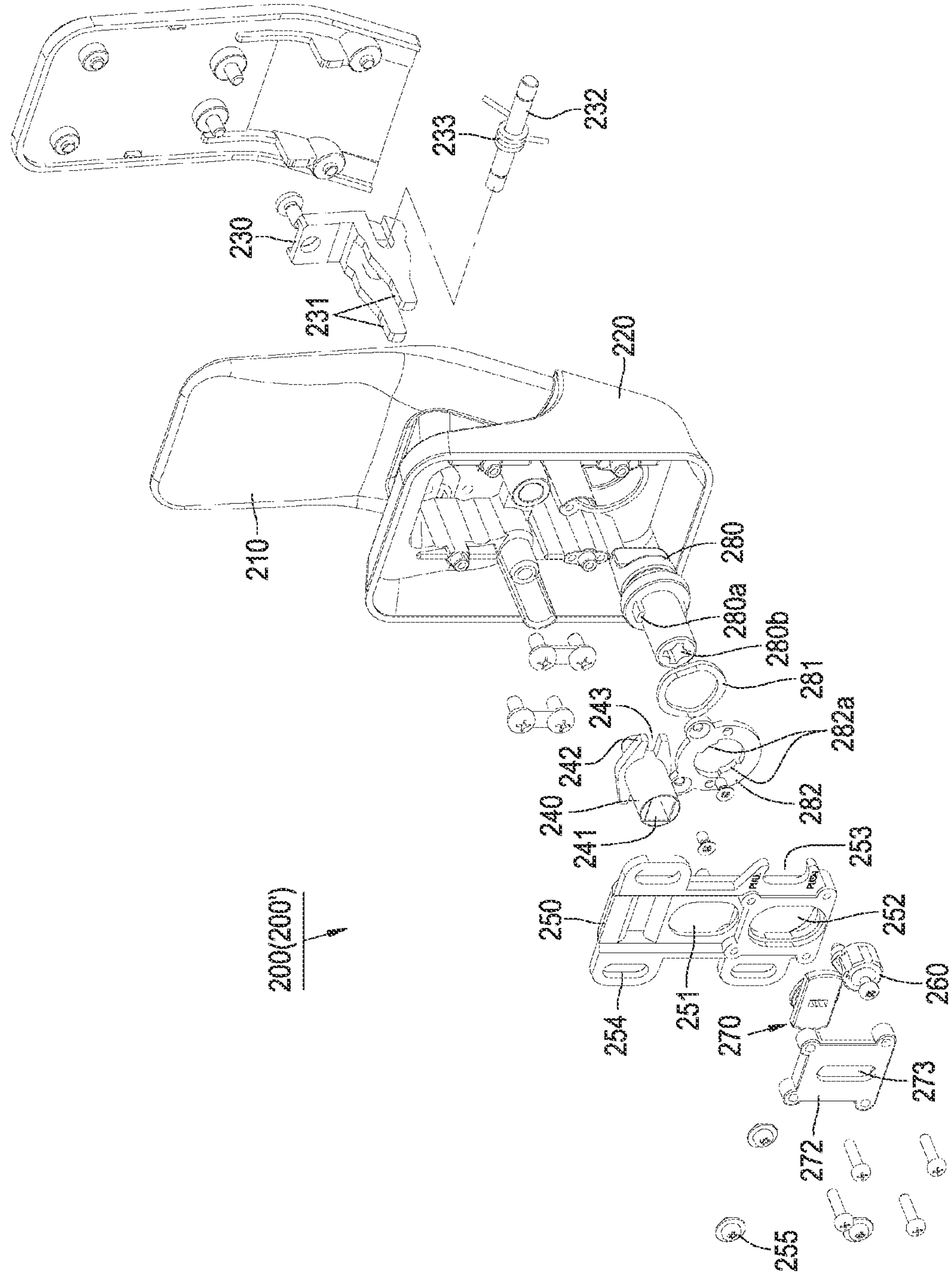
FIG. 5 is an exploded perspective view showing the indoor handle of FIG. 3 in the other direction.

Further, as shown in FIGS. 4 and 5, a hinge shaft 232 for coupling the handle 210 to the body 220 is coupled to the lower end portion of the handle 210 in a state of passing through the body 220 and the handle 210, and a torsion spring (hereinafter referred to as "spring") 233 is fitted to the hinge shaft 232. One end (upper end) of the spring 233 is fixedly coupled to the handle 210 and the other end (lower end) thereof to the body 220, so that the spring 233 becomes compressed when the handle 210 rotates and thus provides a restoring force for returning the rotating handle 210 to its original position.

Further, a "L"-shaped rotary link 230 is fitted to the hinge shaft 232, together with the spring 233, and the upper end portion of the rotary link 230 is fixedly coupled to the handle 210. Further, the rotary link 230 has hook bars 231 protruding from the side end portion as the opposite side to the upper end portion thereof toward the interior of the body 220.

As a result, if the handle 210 is pushed or pulled toward and from the body 220 to thus rotate, the spring 233 is compressed by the rotating handle 210, and as the rotary link 230 rotates together with the handle 210, the hook bars 231 of the rotary link 230 rotates in the body 220 in a clockwise (upward) direction or counterclockwise (downward) direction when FIG. 3 is taken as a standard.

Further, a guide plate 250 is located at the inside of the body 220 facing the door D, coupled to the hook bars 231 of the rotary link 230, and moves upward and downward when the rotary link 230 rotates, and in this case, the guide plate 250 linearly moves upward and downward inside the body 220.

Figure 6:
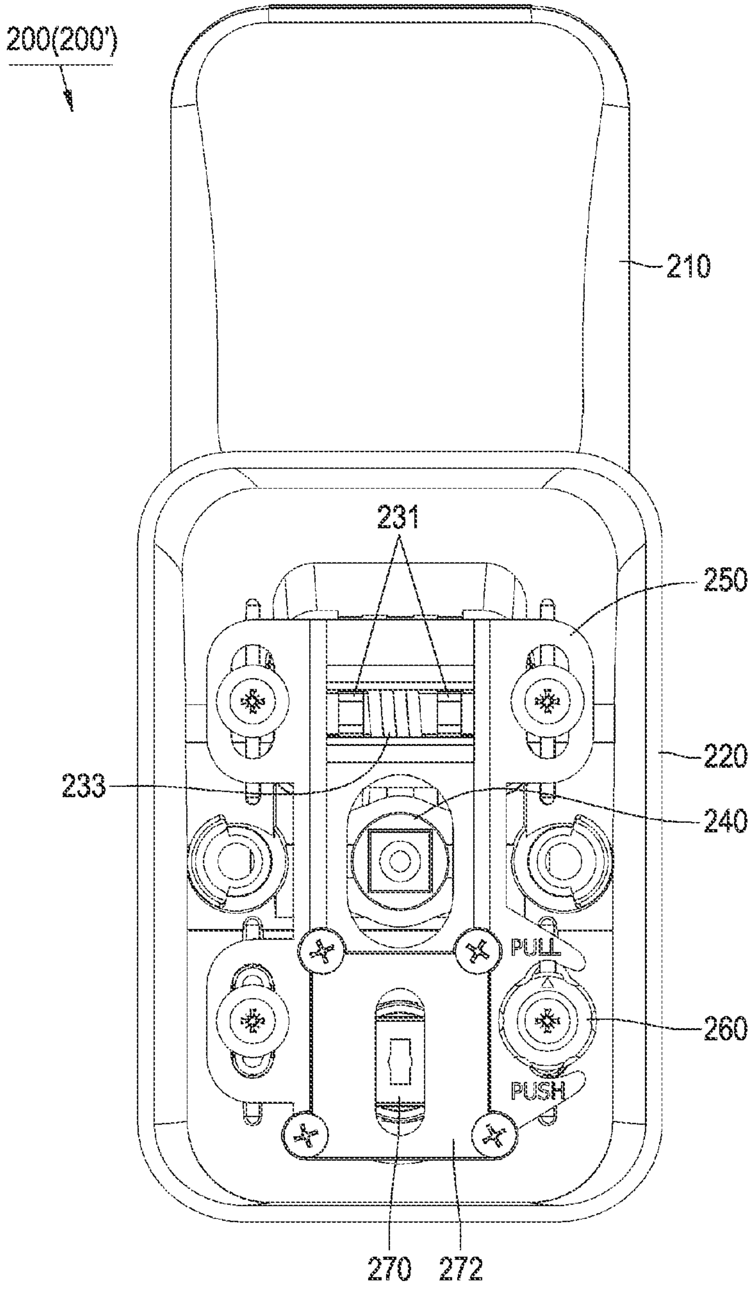
FIG. 6 is a front view showing the indoor handle of FIG. 3.

As shown in FIG. 6, the guide plate 250 is a rectangular plate adapted to cover the front surface of the body 220 and has upward and downward extending guide holes 254 formed on both sides of upper and lower portions thereof, and guide pins 255 pass through the guide holes 254 and are thus fastened to the body 220.

As a result, the guide plate 250 is restrainedly disposed between the guide pins 255 and the body 220 to allow the rotating operations of the rotary link 230 to be converted into the upward and downward linear movements thereof by means of the guide pins 255 and the guide holes 254.

In this case, one side guide hole of the guide holes 254 of the guide plate 250 is an incised hole 253 that is open outward therefrom.

A select knob 260 passes through the incised hole 253 to convert the push and pull directions of the handle 210, and as a stop protrusion protruding outward from the select knob 260 comes into close contact with top and bottom of the incised hole 253, the guide plate 250 is limited in the upward and downward movements to convert the push and pull directions of the handle 210.

Further, the open portion of the incised hole 253 in advance prevents the stop protrusion from lockedly interfering with the inner peripheral surface thereof when the select knob 260 rotates, thereby inducing the select knob 260 to gently rotate.

Furthermore, the guide plate 250 has a plurality of upward and downward extending long holes 251 and 252 formed at the center thereof, and the upper long hole 251 is located at the upper side of the guide plate 250, while the lower long hole 252 at the lower side thereof. The spindle 240 as will be discussed later is rotatably coupled to the upper long hole 251, and a locking shaft 291 of the key assembly 290 as will be discussed later passes through the lower long hole 252.

Moreover, the spindle 240 is rotatably coupled to the central portion of the body 220, and the front end periphery of the spindle 240 passes through the upper long hole 251 of the guide plate 250 and is relatively non-rotatably coupled to the rotary shaft 310 of the door locking part 300. Further, upper and lower protrusions 242 protrude from the rear end periphery of the spindle 240 and are thus coupled to the guide plate 250.

The spindle 240 has an square-shaped insertion groove 241 formed on the front surface thereof correspondingly to the rotary shaft 310 of the door locking part 300 and thus non-rotatably coupled to the rotary shaft 310 by means of shape matching, and the upper and lower protrusions 242 of the spindle 240 protrude toward left and right sides perpendicular to the axial direction of the spindle 240 from the top and bottom sides of the spindle 240 of the rear end periphery thereof. Further, coupling holes 243 are formed between the upper and lower protrusions 242 of the spindle 240 to coupledly insert coupling protrusions 256 protruding from the rear surface of the guide plate 250 thereto.

Moreover, as shown in FIG. 4, the guide plate 250 has the coupling protrusions 256 protruding from the rear surface thereof and restrainedly coupled to the coupling holes 243 of the spindle 240, and the coupling protrusions 256 may be formed on both sides of the rear surface of the guide plate 250 correspondingly to the coupling holes 243 of the spindle 240, but even though only one coupling protrusion 256 is formed on one side of the rear surface of the guide plate 250, the guide plate 250 moving upward and downward can gently rotate the spindle 240. According to the present invention, therefore, an embodiment in which only one coupling protrusion 256 is formed on one side of the rear surface of the guide plate 250 is suggested.

As a result, the rotating operations of the handle 210 by the pull and push operations are converted into the upward and downward movements of the guide plate 250 by means of the rotary link 230, and the upward and downward movements of the guide plate 250 are converted into the rotating operation of the spindle 240 to thus rotate the rotary shaft 310 of the door locking part 300, so that the locking state of the door locking part 300 becomes released.

The locking means forcedly stops the upward and downward movements of the guide plates 250 of the handle parts 200 and 200' to allow the operation of the push pull door lock 100 to be locked.

That is, as shown in FIGS. 2 and 3, the locking means includes the key knob 280 rotatably disposed on the body 220 of the indoor handle 210, the key assembly 290 rotatably disposed on the body 220 of the outdoor handle 210 and connectedly rotating unitarily with the key knob 280, and a stopper 270 connectedly rotating unitarily with the key assembly 290 to lock the operations of the handles 210.

As shown in FIGS. 4 and 5, if the key knob 280 located integrally with the lower portion of the body 220 of the indoor handle 210 is grasped to rotate, the operation of the push pull door lock 100 on the indoor side is locked.

Like this, the key knob 280 disposed on the indoor body 220 has a front end portion passing through the lower long hole 252 of the guide plate 250 inside the body 220 and an insertion groove **280*b* formed on the front surface thereof to coupledly insert the locking shaft 291 of the key assembly 290** as will be discussed later thereinto.

Further, a wave washer 281 and a ring-shaped clamp 282 are fitted to the outer peripheral surface of the key knob 280 protruding toward the inside of the body 220, and the clamp 282 is fixedly coupled to the body 220 by means of screws.

Further, the clamp 282 has locking projections **282*a* protruding from the inner peripheral surface thereof to restrict the rotation of the key knob 280, and the key knob 280 has locking protrusions 280*a* protruding from the outer peripheral surface thereof correspondingly to the locking projections 282*a* and thus locked onto the locking projections of the clamp 282** to stop the rotation thereof.

If the key assembly 290, which is disposed integrally with the lower portion of the body 220 of the outdoor handle 210, rotates in a state where a key is inserted, it can lock the operation of the push pull door lock 100 on the outdoor side.

The key assembly 290 includes the locking shaft 291 protruding therefrom and having the shape of a rectangular bar, and the locking shaft 291 is non-rotatably coupled to the insertion groove **280*b* of the key knob 280 to allow the key knob 280 to interlock with the key assembly 290**.

In this case, a reference numeral "292" not explained represents a hollow key bar connecting the body 220 of the outdoor handle 210 to the body 220 of the indoor handle 210.

Further, the stopper 270 is coupled to the front surface of the key knob 280, and in specific, the stopper 270 is located on the front surface of the guide plate 250 and thus coupled to the front surface of the key knob 280 passing through the lower long hole 252 of the guide plate 250.

The stopper 270 has the shape of a rectangle with curved portions 270*a* protruding from both ends thereof in a longitudinal direction thereof, and the curved portions 270*a* each have the same circumferential surface as the arch formed upon the rotation of the stopper 270. Further, the stopper 270 has a coupling hole 271 formed at the central portion thereof to the shape of a rectangle corresponding to the locking shaft 291 and coupled to the locking shaft 291 by means of shape matching, so that when the locking shaft 291 rotates, the stopper 270 rotates integrally with the locking shaft 291.

Further, a cover 272 is fixedly coupled to the front surface of the guide plate 250 on which the stopper 270 is located, and the cover 272 has a space isolated from the guide plate 250, and in the space is accommodated the stopper 270.

Besides, the cover 272 has locking grooves 272*a* formed curved to the form of the arches corresponding to the curved portions 270*a* of the stopper 270 on the upper and lower ends of the rear surface facing the guide plate 250 and a through hole 273 formed at the central portion thereof and having an inner diameter causing no interference with the locking shaft 291 even though the locking shaft 291 passes therethrough and rotates.

As a result, while the stopper 270 is rotating, the curved portions 270*a* formed on both long sides of the stopper 270 rotate by 90°, are inserted into the locking grooves 272*a* rounded on the upper and lower ends of the cover 272, and are surface-contacted with the locking grooves 272 by means of shape matching, so that the stopper 270 rotates gently, without any interference, by means of the shape matching of the curved portions 270*a* and the locking grooves 272*a*, and the upward and downward movements of the guide plate 250 are firmly blocked by means of the surface contact with the curved portions 270*a* and the locking grooves 272*a* to thus lock the operation of the push pull door lock 100.

Further, the stopper 270 and the cover 272 are disposed on each of the outdoor handle 210 and the indoor handle 220, and accordingly, the locking shaft 291 of the outdoor handle 210 passes through the stoppers 270 and the covers 272 of the outdoor handle 210 and the indoor handle 220 sequentially and are then insertedly coupled to the insertion groove 280*b* of the key knob 280.

Under the above-mentioned configuration, an explanation of the operating relation of the push pull door lock according to the present invention will be given.

Figure 8:
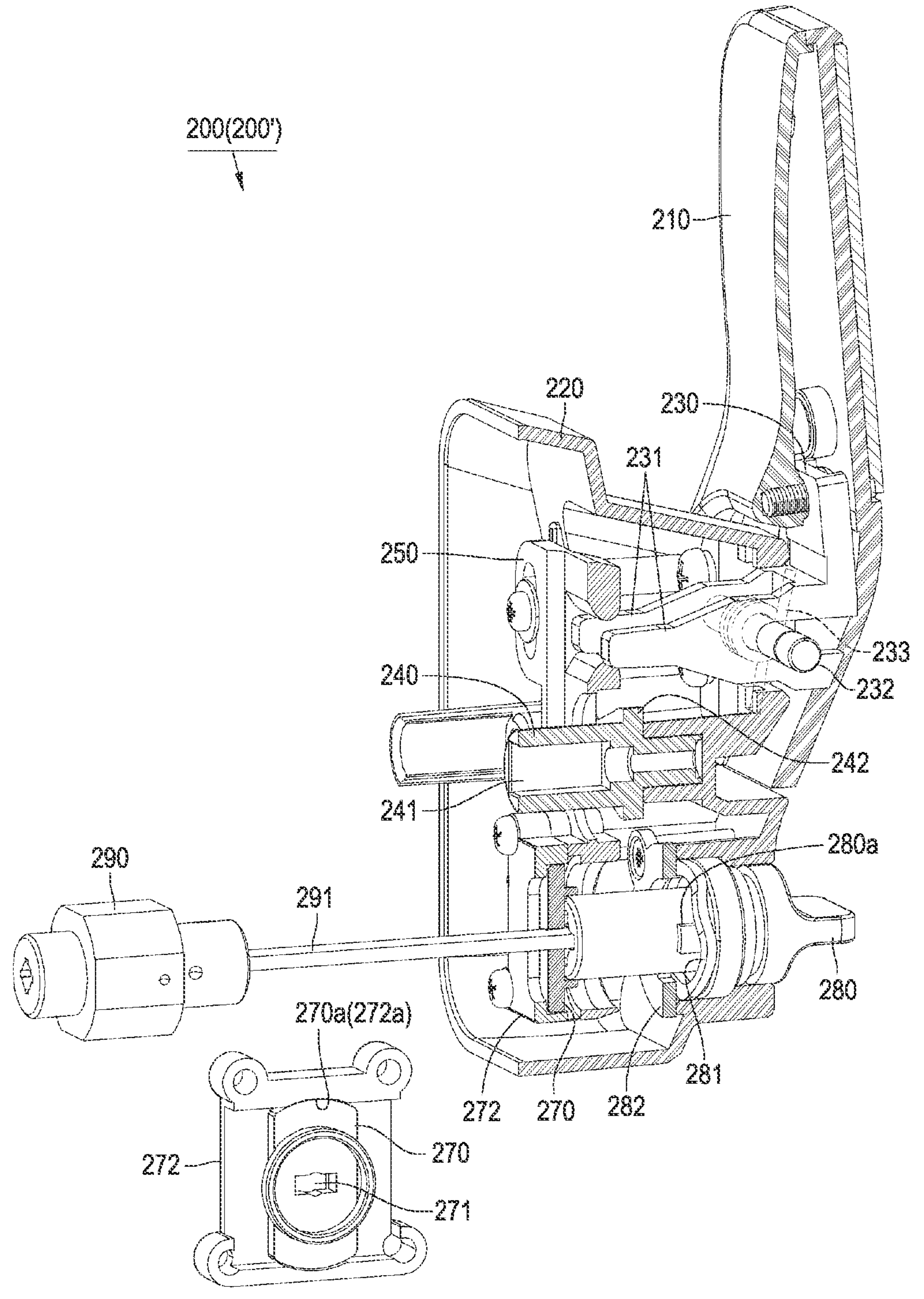
FIG. 8 is a side sectional view of FIG. 3 showing a locking state of the push pull door lock according to the present invention.

If it is desired that the indoor handle 210 is pushed to open the door D, that is, the handle 210 located on the indoor side of the door D is pressedly pushed toward the door D, and accordingly, as shown in FIGS. 8 and 9, the rotary link 230 rotates in the counterclockwise direction, together with the handle 210 to allow the guide plate 250 connected to the hook bars 231 of the rotary link 230 to be descended vertically at the inside of the body 220.

As a result, the spindle 240, which has the upper and lower protrusions 242 fittedly coupled to the coupling protrusion 256 of the guide plate 250 rotates to the left side, that is, in the counterclockwise direction on the body 220 to thus rotate the rotary shaft 310 of the door locking part 300, so that as the locked state of the door D is released, the door D is pushed to open.

Contrarily, if it is desired that the outdoor handle 210 is pulled to open the door D, the handle 210 located on the outdoor side of the door D is pulled from the door D, and the rotary link 230 rotates in the clockwise direction, together with the handle 210 to allow the guide plate 250 to be ascended vertically at the inside of the body 220.

As a result, the spindle 240 rotates in the right direction, that is, the clockwise direction on the body 220 by means of the vertically ascended guide plate 250 to thus rotate the rotary shaft 310 of the door locking part 300, so that as the locked state of the door D is released, the door D is pulled to open.

Figure 7:
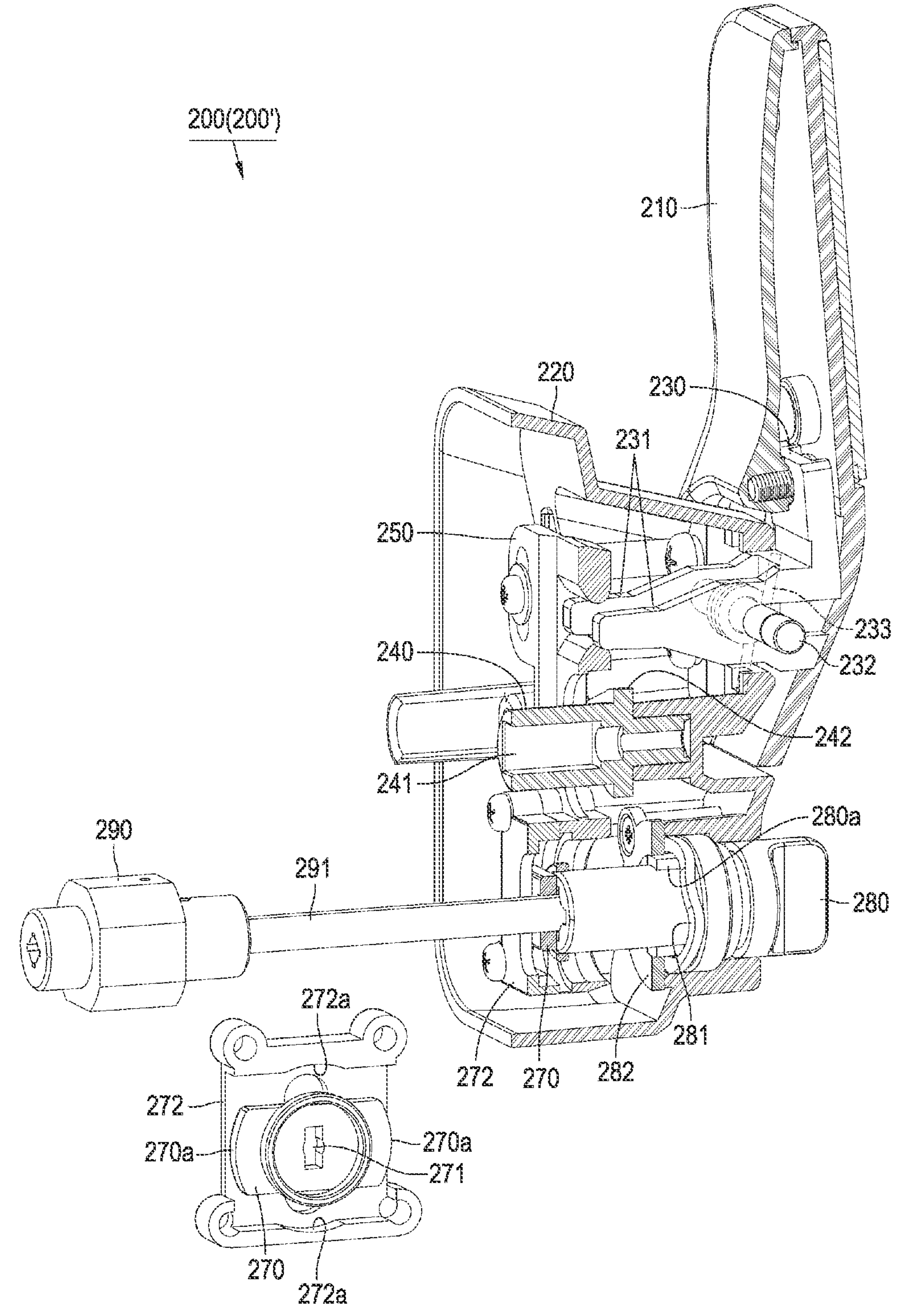
FIG. 7 is a side sectional view of FIG. 3 showing the side structure of the push pull door lock according to the present invention.

If the key knob 280 disposed on the indoor side of the door rotates or if the key is coupled to the key assembly 290 on the outdoor side of the door to thus rotate the key assembly 290, the locking shaft 291 rotates by means of the rotation of the key knob 280 or the key assembly 290, and accordingly, the stopper 270 coupled to the locking shaft 291 rotates to the state as shown in FIG. 7 from the state as shown in FIG. 6.

In specific, the stopper 270 after rotated allows the curved portions 270*a* formed on both side end portions with longer lengths to be located on the upper and lower end portions of the cover 272, inserted into the locking grooves 272*a* curved on the cover 272, and surface-contacted therewith.

Even though the indoor or outdoor handle 210 is pushed or pulled, the cover 272 fixed to the guide plate 250 is locked onto the stopper 270 surface-contacted with the locking grooves 272*a* formed on the upper and lower end portions thereof, and accordingly, the guide plate 250 is kept to a fixed state in position, without any movement. As a result, the operation of the push pull door lock 100 becomes locked to lock the door D.

Contrarily, if the key knob 280 or the key assembly 290 rotates to the opposite direction to the above-mentioned direction, the locking shaft 291 rotates to the opposite direction to the above-mentioned direction, and accordingly, the stopper 270 releases the locked state of the cover 272 thereonto. As a result, the cover 272 and the guide plate 250 are movable upward and downward, and accordingly, the handle 210 is pushed or pulled to open the door D.

As mentioned above, the preferred embodiment of the present invention has been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings.

It is therefore intended that the scope of the invention be limited not by this detailed description, but rather by the claims appended hereto.

(Explanation of reference numerals)

| | |
|---|---|
| 100: Push pull door lock | 200, 200': Handle part |
| 210: Handle | 220: Body |
| 230: Rotary rink | 231: Hook bar |
| 232: Hinge shaft | 233: Spring |
| 240: Spindle | 241: Insertion groove |
| 242: Protrusion | 243: Coupling hole |
| 250: Guide plate | 251, 252: Long hole |
| 253: Incised hole | 254: Guide hole |
| 255: Guide pin | 256: Coupling protrusion |

-continued

| (Explanation of reference numerals) | |
|---|---|
| 260: Select knob | 270: Stopper |
| 270a: Curved portion | 271: Coupling hole |
| 272: Cover | 272a: Locking groove |
| 273: Through hole | 280: Key knob |
| 280a: Locking protrusion | 280b: Insertion groove |
| 281: Wave washer | 282: Clamp |
| 282a: Locking projection | 290: Key assembly |
| 291: Locking shaft | 292: Key bar |
| 300: Door locking part | 310: Rotary shaft |

The invention claimed is:

1. A push pull door lock comprising a door locking part disposed inside a door to lock the door, bodies fixedly located to the indoor and outdoor sides of the door, handles pushedly or pulledly disposed on the bodies to release a locking state of the door locking part, and locking means disposed on the bodies to lock the operations of the handles so that the door is locked, wherein the locking means comprises:

a key knob rotatably disposed on the body located on the indoor side of the door;

a key assembly rotatably disposed on the body located on the outdoor side of the door and connectedly rotating unitarily with the key knob; and a stopper connectedly rotating unitarily with the key assembly and locking the operations of the handles, wherein each body comprises a guide plate moving upward and downward therein by means of the pushing or pulling operation of the handle, and the locking means comprises a cover fixedly coupled to the front surface of the guide plate, while allowing one surface facing the guide plate to be spaced apart from the guide plate, the cover having locking grooves formed on the upper and lower ends thereof to come into contact with the stopper rotating, so that as the stopper rotates between the guide plate and the cover, the stopper is locked onto the locking grooves of the cover to stop the upward and downward movements of the guide plate.

2. The push pull door lock according to claim 1, wherein the stopper has the shape of a rectangle with curved portions protruding from both ends thereof in a longitudinal direction thereof, the curved portions each having the same circumferential surface as the arch formed upon the rotation of the stopper, and the inner peripheral surfaces of the locking grooves of the cover are curved to the shapes of arches corresponding to the curved portions, so that the curved portions of the stopper are surface-contacted with the locking grooves of the cover.

3. The push pull door lock according to claim 2, wherein the key assembly comprises a locking shaft connectedly rotating unitarily with the key knob by the rotation of a key coupled thereto, and the stopper is rotatably coupled to the key knob, coupledly passes the locking shaft therethrough, and rotates unitarily with the locking shaft.

4. The push pull door lock according to claim 1, wherein each body comprises a rotary link rotating in the same direction as the rotating direction of the handle by means of the pushing or pulling operation of the handle to move the guide plate upward and downward and a spindle rotating in the perpendicular direction to the rotating direction of the handle by means of the upward and downward movements of the guide plate to operate the door locking part, so that the locking state of the door locking part is released.

5. The push pull door lock according to claim 4, wherein the spindle has a plurality of protrusions protruding outward therefrom and spaced apart from each other, and one side of the guide plate is coupled between both protrusions, so that the upward and downward movements of the guide plate are converted into the rotating operations of the spindle.

* * * * *